(12) United States Patent
Wiebe

(10) Patent No.: US 6,689,966 B2
(45) Date of Patent: Feb. 10, 2004

(54) SYSTEM AND METHOD FOR DETERMINING POSITIONAL INFORMATION

(75) Inventor: Linus Wiebe, Malmo (SE)

(73) Assignee: Anoto AB, Lund (SE)

( * ) Notice: Subject to any disclaimer, the term of this patent is extended or adjusted under 35 U.S.C. 154(b) by 165 days.

(21) Appl. No.: 09/812,900

(22) Filed: Mar. 21, 2001

(65) Prior Publication Data

US 2002/0021284 A1 Feb. 21, 2002

Related U.S. Application Data

(60) Provisional application No. 60/207,885, filed on May 30, 2000.

(30) Foreign Application Priority Data

Mar. 21, 2000 (SE) .............................................. 0000949

(51) Int. Cl.⁷ .............................................. G08C 21/00
(52) U.S. Cl. .................. 178/18.01; 178/18.03; 178/18.09; 178/19.01; 345/173; 345/179; 235/494; 382/188; 382/299; 382/314
(58) Field of Search ................................ 345/156–158, 345/162, 163, 165, 166, 173, 175, 179; 178/18.01, 18.03, 18.09, 19.01, 19.05; 235/494, 454–456; 382/181–184, 188, 299, 201, 312–314, 317

(56) References Cited

U.S. PATENT DOCUMENTS

| | | | | |
|---|---|---|---|---|
| 5,194,852 A | * | 3/1993 | More et al. .................. | 345/182 |
| 5,221,833 A | | 6/1993 | Hecht | |
| 5,303,312 A | * | 4/1994 | Comerford et al. ......... | 382/189 |
| 5,329,107 A | | 7/1994 | Priddy et al. | |
| 5,343,031 A | * | 8/1994 | Yoshida ...................... | 235/494 |
| 5,416,312 A | | 5/1995 | Lamoure | |
| 5,852,434 A | | 12/1998 | Sekendur | |
| 6,186,405 B1 | * | 2/2001 | Yoshioka .................... | 235/494 |
| 6,502,756 B1 | * | 1/2003 | Fåhraeus | |
| 6,570,104 B1 | * | 5/2003 | Ericson et al. ........... | 178/18.09 |
| 6,586,688 B2 | * | 7/2003 | Wiebe ..................... | 178/18.09 |
| 6,606,396 B1 | * | 8/2003 | Ishibashi et al. ............ | 382/112 |

FOREIGN PATENT DOCUMENTS

| | | |
|---|---|---|
| EP | 0171284 A2 | 12/1986 |
| WO | WO 98/20446 | 5/1998 |
| WO | WO 00/73983 A1 | 12/2000 |
| WO | WO 01/16691 A1 | 3/2001 |
| WO | WO 01/26032 A1 | 4/2001 |

* cited by examiner

Primary Examiner—Richard Hjerpe
Assistant Examiner—Henry N. Tran
(74) Attorney, Agent, or Firm—Birch, Stewart, Kolasch & Birch, LLP

(57) ABSTRACT

A product has a surface having with a position-coding pattern that codes a plurality of positions on the surface. The position-coding pattern includes a plurality of symbols each having at least two different values. Each position on the surface being coded with a plurality of symbols. Each symbol including a raster point in a raster extending over the surface, and at least one marking, the location of which in relation to the raster point specifies the value of the symbol. The markings can include information representing more than one spatial resolution level and varying between different markings. The position-coding pattern can be used in different contexts for position determination such as digitizing handwriting.

19 Claims, 4 Drawing Sheets

SYSTEM AND METHOD FOR DETERMINING POSITIONAL INFORMATION

CROSS REFERENCE TO RELATED APPLICATIONS

This application claims priority benefits based on Swedish Patent Application No. 0000949-8, filed Mar. 21, 2000, and U.S. Provisional Application No. 60/207,885, filed May 30, 2000, the technical disclosures of each are hereby incorporated herein by reference.

FIELD OF THE INVENTION

The present invention relates to pattern recognition and specifically relates to devices and methods relating to surfaces having a coding pattern available for analysis.

BACKGROUND OF THE INVENTION

In many contexts, it is desirable to be able to determine an absolute position on a surface. One example is in the digitization of drawings. Another example is when it is desirable to produce an electronic version of handwritten information. In these and other contexts in which position determination is performed, it is often desirable to use a computer program in cooperation with an input device to carry out calculations related to position determination.

U.S. Pat. No. 5,852,434, for example, discloses a device for determining an absolute position. The device includes a writing surface having a position-coding pattern used to determine X/Y coordinates, a detector for detecting the position-coding pattern and a processor for determining the position of the detector in relation to the writing surface based on the detected position-coding pattern. The device makes it possible for a user to input handwritten and hand-drawn information into a computer at the same time as the information is written/drawn on the writing surface.

A number of examples of position coding are given in U.S. Pat. No. 5,852,434. The first example shows symbols built up of three concentric circles, with the outermost circle representing the x-coordinate and the middle one representing the y-coordinate. The two outermost circles are further divided into 16 parts that specify different numbers depending on their fill pattern. Each pair of x/y coordinates is coded with a complex symbol having a special appearance. In the second disclosed example, the coordinates at every point on the writing surface are identified with the aid of a bar code, a bar code for the x-coordinate being specified above a bar code for the y-coordinate.

Devices in the prior art used for this type of detection are generally constructed to register four symbols at the same time ensuring a reliably capture of at least one symbol in its totality. This capture is necessary for the device to perform the position determination.

The prior art summarized above does not disclose, for example, a computer program used in cooperation with an input device to perform calculations related to the position determination because generally only position information is processed. The prior art has further shortcomings because the patterns used are built up of complex symbols, the information content of that indicates the actual positions. The smaller these symbols are the more difficult it becomes to produce the patterned writing surface, while increasing the risk of erroneous position determinations. On the other hand, the use of larger the symbols decreases the position resolution.

In Applicant's International Patent Application WO 00/73983, which was filed on Oct. 1, 1999 and which was not publicly available when the present application was filed and therefore does not constitute prior art, a position coding pattern is described. Moreover reference is also made to PCT/SE00/01895 and WO 01/16691, the contents of which are included by reference.

A solution therefore is required to overcome the deficiencies of the prior art.

SUMMARY OF A FEW ASPECTS OF THE INVENTION

Systems and methods consistent with the present invention may have coding patterns with a number of spatial levels and utilizing the spatial levels.

It is an object of the present invention to remedy the abovementioned deficiencies of prior art completely or partially.

More specifically, the invention relates to a product that has a surface that is provided with a coding pattern that comprises symbols that have at least two different values. The invention is characterized in that each symbol comprises a raster point and at least one marking, that the raster point is included in a raster which extends over the surface; that the value of each symbol is indicated by the location of said marking in relation to a raster point and that at least one marking comprises marking information.

In prior art, each position is coded with a complex symbol, the complete information content of which is needed for specifying position information. According to the invention, instead, a symbol is used the value of which is specified by the location of a marking in relation to a raster point. There is thus one type of symbol for each value. A device which will carry out the position determination therefore only needs to detect the occurrence of one marking. Moreover, a position-determining device according to the invention can distinguish between different markings and thereby acquire further information related to, for example, the position in question. This further marking information can advantageously vary depending on the position that is determined.

The design of the symbol according to the invention also entails that a surface which is provided with a coding pattern according to the invention becomes more aesthetically pleasing.

Furthermore, a large distance between the markings in relation to the position-information density is made possible, which has the result that the coding becomes less sensitive to movement blur.

The symbols described above can be used for coding any type of information but are advantageously used for coding positions and position-related further information via the markings of the symbols. As mentioned, in prior art each position is coded with a single symbol that therefore must be rather complex. According to the invention, on the other hand, each position can be coded with a plurality of symbols. Each individual symbol can thus be made less complex and thus simpler to detect with higher reliability.

According to the invention, the position information and position-related information are separated in that the markings of the symbols contain different types of information depending on which spatial resolution is taken into consideration. In a first spatial resolution level, the markings of the symbols are only used for specifying position information. By taking into consideration further spatial resolution levels that are higher than the first one, the further information can be coded and retrieved from the markings. An obvious advantage of this separation of information into different spatial resolution levels is that, even if reading the markings entails loss of detail information, at least the information which has been stored with the lowest spatial resolution, i.e. the existence of the markings itself, can be utilized. This will also prove to be advantageous when considering reading devices and their capability of reading information of different spatial resolution, as will be discussed further below.

In prior art, each position is coded with a symbol that is "isolated" from symbols of the surrounding positions. The position resolution is thus limited by the surface occupied by the symbol of a position. The position-coding pattern according to the invention can be built up in corresponding manner, each position being coded by an "isolated" group of symbols. In a preferred embodiment of the invention, however, each symbol contributes to the coding of more than one position. In this manner, a "floating" transition between different positions is obtained. In other words, each position is coded partly by the same symbols as the adjoining positions. The floating coding is advantageous since it makes it possible to increase the position resolution. Furthermore, it is possible to reduce the relationship between, on the one hand, the number of symbols which a position-determining device must register in order to be able to carry out a position determination reliably and, on the other hand, the number of symbols which code a position.

In a preferred embodiment, each symbol contributes to the coding of both a first and a second position coordinate. Thus, different symbols are not needed for the different coordinates, which make the position code simpler and the position resolution better. The coordinate system can be suitably Cartesian but other types of coordinate systems are also conceivable.

Furthermore, the value of each symbol can be advantageously translatable into at least a first digit which is used for coding the first coordinate, and at least a second digit which is used for coding the second coordinate, the symbols in the position-coding pattern together representing a first position code for the first coordinate and a second position code for the second coordinate. The two coordinates can then be coded independently of one another, which makes the coding simpler when the coding is "floating". Preferably, the value of the symbol is represented in a binary manner, a first bit being used for the coding of a first coordinate and a second bit for the coding of a second coordinate.

The position-coding pattern is advantageously based on a first cyclic, preferably binary, number series which has the characteristic that no sequence with a first predetermined number of digits appears more than once in the number series. Due to the fact that the position-coding pattern is built up in this manner, it will contain inherent information about the positions so that the coordinates can be calculated according to predetermined rules. This is advantageous in that it means that the decoding of the position-coding pattern can be implemented in an efficient manner in, for example, software. Besides, it will be much simpler to produce the position-coding pattern in this way compared with trying to randomly generate an unambiguous position-coding pattern of a floating type.

In one embodiment, the product can comprise a plurality of writing surfaces each of which comprises the position-coding pattern with the further marking information coded in a number of markings. For example, the product can consist of a notepad with a plurality of sheets, such as maps, forms, blanks etc. The position-coding patterns then differ for the various writing surfaces by the sequence in the cyclic number series with which a predetermined column or row begins. The "same" pattern can thus be used for a plurality of writing surfaces which can be separated or integrated with one another by allowing, for example, the first column to begin at different positions in the number series.

Considering the further marking information, this can be seen as providing an extension of the cyclic number series with the advantage of providing an even larger available area, which can be provided with a unique coding pattern.

The position-coding pattern can be implemented with any parameter whatever that can be used for producing symbols of the above-mentioned type which can be detected by a detector. The parameter can be electric or chemical or of another type. However, the position-coding pattern is preferably optically readable which makes it simpler to apply it to the surface. The pattern should thus be able to reflect or absorb light but the light does not need to lie within the visible range.

The raster and/or the raster points can be implemented on the surface. In a preferred embodiment, however, the raster and the raster points are virtual. Thus, the raster is not marked on the surface at all but only constitutes an imaginary raster which forms the base of the coding but which can be located on the basis of the location of the markings.

The products described above can be any products whatever that have a surface with a coding pattern. They can be used for a large number of different applications. For example, they can be used for continuously registering the position of a pen which is conducted over the writing surface where the further position-related marking information, for example, contains direct information about how the written text is to be reproduced, for example on a computer screen. Further examples comprise a map with a printed pattern according to the invention, whereby, for example, the further information in the markings can contain information relating, for example, levels of elevation. They can also be used in determining the position of a tool, an instrument or the like. They can also be used as a mouse pad. A person skilled in the art can think of many other applications.

According to yet another aspect of the invention, it relates to a computer program for determining the position of a partial surface on a surface, which is provided with a position-coding pattern which comprises a plurality of symbols, on the basis of an image of the partial surface, each symbol comprising a raster point and at least one marking, the computer program being stored on a storage medium which can be read by a computer and which comprises instructions for causing the computer to locate a predetermined plurality of symbols in the image, to determine the value of each of the said predetermined plurality of symbols, to separate the position-coding pattern in the image into a first position code for a first coordinate and a second position code for a second coordinate by translating the value of each symbol into at least a first digit for the first position code and at least a second digit for the second position code, and to calculate the first coordinate with the aid of the first position code and the second coordinate with the aid of the second position code. Moreover, the locating of at least one marking is carried out, which comprises marking information, after which this is interpreted.

The computer programs can be used together with prior-art position-determining devices. They can be installed in a separate computer to which images of the position-coding pattern are sent, or in the actual device that registers the position-coding pattern.

According to another aspect of the invention, it relates to a device for position determination, comprising a sensor for producing an image of a partial surface on a surface and image-processing devices which are arranged to decode a position-coding pattern on a product the surface being a surface on the product, which surface is provided with the position-coding pattern.

More specifically, systems and methods consistent with the present invention may employ a principle surface with a coding pattern that may include symbols having at least two different values. Each symbol may include a raster point and at least one marking. The raster point may be included in a raster extending over the surface, and the value of each symbol may be indicated by the location of the marking in relation to a raster point. The marking may include marking information.

Another aspect of the invention, may employ a program stored on a computer-readable medium for determining the position of a partial surface on a surface having a position-coding pattern that includes a plurality of symbols, with each symbol including a raster point and at least one marking. The program may include instructions for locating a predetermined plurality of symbols in an image of the partial surface, determining the value of each said predetermined plurality of symbols, separating the position-coding pattern into a first position code for a first coordinate of the partial surface and a second position code for a second coordinate of the partial surface by translating the value of each symbol into at least a first digit for the first position code and at least a second digit for the second position code. The program instruction may further calculate the first coordinate using the first position code and the second coordinate using the second position code, calculate the value of each symbol by determining the location of each marking in relation to the raster point; locate at least one marking having marking information; and interpret the marking information.

In another aspect, a system according to the invention may include a sensor configured to produce an image of a partial surface of a plurality of partial surfaces on a principle surface, the partial surface including a position-coding pattern. The system further may include an image-processing element configured to locate a predetermined plurality of symbols in the image, with each symbol including at least one marking. The image processing element may also be configured to determine the value of each of the predetermined plurality of symbols, separate the position-coding pattern in the image into a first position code for a first coordinate for the partial surface and into a second position code for a second coordinate for the partial surface by translating the value of each symbol into at least a first digit for the first code and at least a second digit for the second code, calculate the first coordinate using the first position code and the second coordinate using the second position code, locate at least one marking which comprises marking information and interpret the marking information. In this aspect, the image-processing element may be in wireless, optical, or direct communication with the sensor.

The capability of interpreting the further information at different spatial resolutions will prove very advantageous in a commercial sense. Devices for interpreting the position information and further information of any spatial resolution are envisaged, but also devices capable of interpreting only position information and further information at only one other spatial resolution (or even no other spatial resolution than that of the position information). Such separation of devices into different levels of capability may be utilized commercially in that several generations of devices may be developed, each being capable of interpreting further information at further spatial resolutions. Backward compatibility will be inherent in that the capability for early generation devices capable of interpreting information at, e.g., one or two spatial resolutions will also be able to interpret the information of the first one or two spatial resolutions from symbols having information at three or more spatial resolutions.

One general advantage of the present invention is the fact that a number of different spatial resolution levels can be used. Reading devices such as reading pens can be provided with different capacity for reading and decoding position information and marking information. For example, a simple and inexpensive reader can be produced for simply reading the pattern at the lowest spatial resolution level whilst a more advanced and more expensive reader can be produced for reading information at a number of spatial resolution levels.

Additional features and advantages of the invention are set forth in the following description, may be apparent from the description, or may be learned by practicing the invention. The foregoing summarizes only a few aspects of the invention and is not intended to be in any way reflective of the full scope of the invention as claimed. Moreover, both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate one embodiment of the invention and, together with the description, serve to explain the objects, advantages, and principles of the invention. In the drawings.

DETAILED DESCRIPTION OF THE PREFERRED EMBODIMENTS

Figure 1:
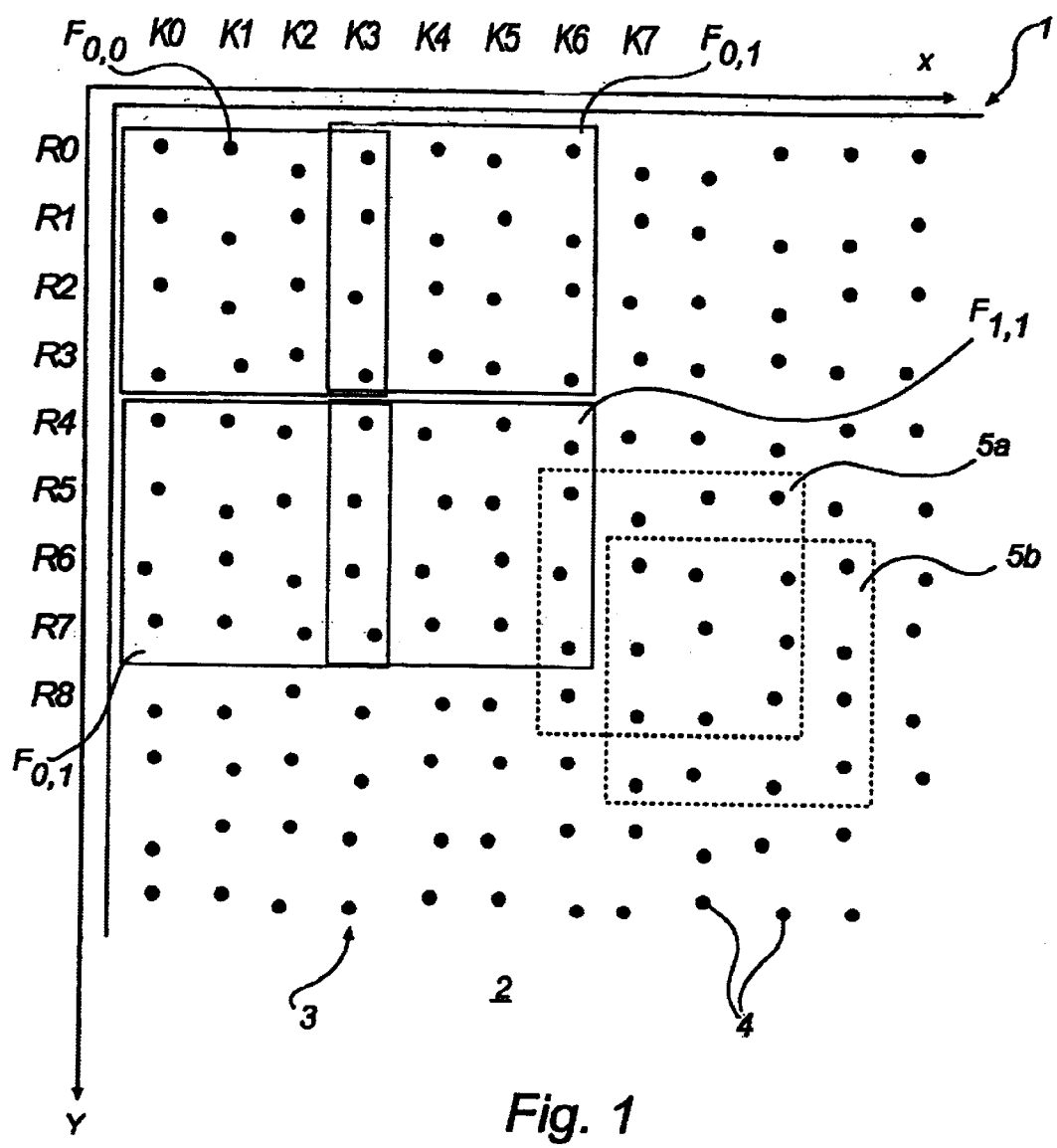
FIG. 1 schematically shows an embodiment of a product according to the present invention which is provided with a position-coding pattern.
Figure 2:
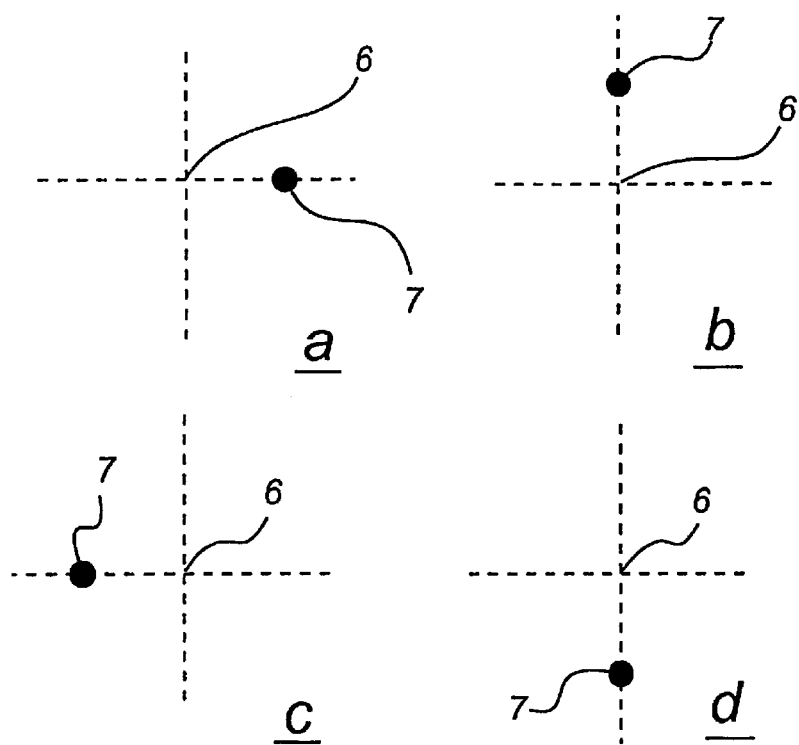
FIGS. 2a–2d schematically show how the symbols can be configured in an embodiment of the invention.

According to the systems and methods consistent with the present invention, position information and position-related information may be separated in that the markings of the symbols contain different types of information depending on which spatial resolution may be taken into consideration. In a first spatial resolution level, the markings of the symbols are only used for specifying position information. By taking into consideration further spatial resolution levels that are higher than the first one, further information can be coded and retrieved from the markings. An obvious advantage of this separation of information into different spatial resolution levels may be that, even if reading the markings entails loss of detail information, at least the information that has been stored with the lowest spatial resolution, i.e. the existence of the markings itself, can be utilized.

Symbols used with systems and methods consistent with the present invention can be employed for coding any type of information but are advantageously used for coding positions and position-related further information via the markings of the symbols. In the prior art, positions may be coded with a single symbol, which therefore must be rather complex. With the invention, each position may be coded with a plurality of symbols. Each individual symbol can thus be made less complex and thus simpler to detect with higher reliability.

Further, a symbol may be used and the value may be specified by the location of a marking in relation to a raster point. There may be one type of symbol for each value. The raster and/or the raster points can be implemented on the surface. In a preferred embodiment, however, the raster and the raster points may be virtual. Thus, the raster may not be marked on the surface at all but may only constitute an imaginary raster that forms the base of the coding but which can be located on the basis of the location of the markings.

A device according to the disclosed embodiment performing position determination therefore may only need to detect the occurrence of one marking. Moreover, a position-determining device, according to the invention, can distinguish between different markings and thereby acquire further information related to, for example, the position in question. This further marking information can advantageously vary depending on the position determined. The device may be implemented as an independent unit, or alternative, the sensor can be physically separated from the image-processing device. A personal computer, for example, could receive the registered images transferred by the sensor.

The design of the symbol according to the invention entails that a surface provided with a coding pattern may become more esthetically pleasing. Further, a large distance between the markings in relation to the position-information density may be made possible, allowing the coding to less sensitive to movement blur.

Generally, positions are coded with a symbol "isolated" from symbols of the surrounding positions. The position resolution may be thus limited by the surface occupied by the symbol of a position. In contrast, the position-coding pattern according to the preferred embodiment can be built up in corresponding manner, each position being coded by an "isolated" group of symbols. Further, each symbol may contribute to the coding of more than one position. In this manner, a "floating" transition between different positions may be obtained. In other words, each position may be coded partly by the same symbols as the adjoining positions. The floating coding may be advantageous since it makes it possible to increase the position resolution. Furthermore, it may be possible to reduce the relationship between the number of symbols that a position-determining device must register to carry out its function reliably, on the one hand, and the number of symbols that code a position, on the other.

In a preferred embodiment, each symbol may contribute to the coding of both a first and a second position coordinate. Thus, different symbols may not be needed for the different coordinates, making the position code simpler and the position resolution better. The coordinate system can be suitably Cartesian but other types of coordinate systems are also conceivable.

Furthermore, in this embodiment the value of each symbol may be translatable into a first digit used for coding the first coordinate, and a second digit used for coding the second coordinate. The symbols in the position-coding pattern together representing a first position code for the first coordinate and a second position code for the second coordinate. The two coordinates can then be coded independently of one another, making the coding simpler when the coding is "floating." Preferably, the value of the symbol may be represented in a binary manner, a first bit being used for the coding of a first coordinate and a second bit for the coding of a second coordinate. The symbol may also be translated into multiple digits, allowing for greater precision.

The position-coding pattern of the preferred embodiment may be advantageously based on a first cyclic, preferably binary, number series. This number series has the characteristic that no sequence with a first predetermined number of digits appears more than once in the number series. Building the position-coding pattern in this manner permits it to contain inherent information about the positions, allowing the coordinates to be calculated under predetermined rules. This may be advantageous because it allows implementation of the decoding of the position-coding pattern in an efficient manner, with software, for example. Moreover, it may be much simpler to produce the position-coding pattern in this manner than to attempt and randomly generate an unambiguous position-coding pattern of a floating type. With this general description specific aspects and various aspects of the preferred embodiments are described below.

FIG. 1 shows a part of a product in the form of a sheet of paper 1 having a principle surface 2 provided with an optically readable position-coding pattern 3. In this example, position-coding pattern 3 consists of symbols 4 systematically arranged over surface 2 so that it has a "patterned" appearance. The symbols 4 include markings that, for the sake of clarity, are depicted as round in FIG. 1. In connection with FIGS. 5a and 5b, a number of other configurations of markings are shown in detail in order to illustrate how more detailed information may be represented at a higher spatial resolution level.

In one embodiment, the product can include a plurality of writing surfaces each of that may include position-coding pattern 3 with the further marking information coded in a number of markings. For example, the product can consist of a notepad with a plurality of sheets, such as maps, forms, blanks etc. The position-coding patterns then differ for the various writing surfaces by the sequence in the cyclic number series with which a predetermined column or row begins. The "same" pattern can thus be used for a plurality of writing surfaces that can be separated or integrated with one another by allowing, for example, the first column to begin at different positions in the number series.

In other embodiments, the products described above can be any products having a surface 2 with a coding pattern 3. Further, the products may be used in a large number of different applications. For example, they can be used for continuously registering the position of a pen that may be conducted over the writing surface. In this case, the further position-related marking information on the product might contain direct information about how the written text may be reproduced such as, for example, on a computer screen. Further examples of products that may use the features of the present invention could include maps with a printed coding pattern. The information in the markings may include information relating to various geographical or topographical information, such as levels of elevation, population statistics, natural resource reserves, etc.

The pattern could also be used to determine the position of a tool, an instrument, etc. It is contemplated that a person skilled in the art will realize many other applications.

Returning to FIG. 1, sheet 1 may have an x-coordinate axis and a y-coordinate axis. In this case, position determination can be performed over the entire surface of the product. In other circumstances, the surface containing the coding pattern may only occupy a selected area of the product. For example, sheet 10 can be used to produce an electronic representation of information that may be written or drawn on the surface. The electronic representation can be produced by continuously determining, while writing on the surface with a pen, the position of the pen on the sheet of paper 1 by reading the position-coding pattern.

The position-coding pattern may include a virtual raster that is neither visible to the human eye nor can be detected directly by a device used to determine positions on the surface, and a plurality of symbols 4 each being able to assume one of four values "1"–"4" as described below. In this context, it should be noted that the position-coding pattern 3 in FIG. 1 has been greatly enlarged for clarity. It is also shown only on a part of the sheet of paper 1.

The position-coding pattern 3 may be arranged in such a manner that the position of a partial surface on the writing surface may be coded by the symbols on this partial surface. Dashed lines in FIG. 1 show a first partial surface 5a and a second partial surface 5b. The part of the position-coding pattern 3 (in this case 4×4 symbols) located on the first partial surface 5a codes a first position, and the part of the position-coding pattern 3 located on the second partial surface 5b codes a second position. Position-coding pattern 3 may be partially common to the adjoining first and second positions. Such a position-coding pattern 3 may be designated as "floating" in this application.

Position-coding pattern 3 can be implemented with any parameter capable of producing symbols detectable by a detector. The parameter can be electric or chemical or of another type. However, position-coding pattern 3 may be optically detectable, making it easier to apply it to surfaces. The pattern should thus be able to reflect or absorb light but this light need not lie within the human visible range.

FIGS. 2a–d show an embodiment of a symbol that may be used in the position-coding pattern according to the invention. The symbol may include a virtual raster point 6 that may be represented by the intersection between the raster lines, and a marking 7 that appears as a dot. The value of the symbol depends on where the marking may be located. In the example in FIG. 2, there are four possible locations, one on each of the raster lines extending from the raster points. The displacement from the raster point may be equal for all values. In the text that follows, the symbol has the value 1 in FIG. 2a, the value 2 in FIG. 2b, the value 3 in FIG. 2c and the value 4 in FIG. 2d. Expressed in other words, there are four different types of symbol.

Each symbol can thus represent four values "1–4". This means that the position-coding pattern can be divided into a first position code for the x-coordinate and a second position code for the y-coordinate. The dividing may be done in accordance with the following:

| Symbol value | x code | y code |
|---|---|---|
| 1 | 1 | 1 |
| 2 | 0 | 1 |
| 3 | 1 | 0 |
| 4 | 0 | 0 |

Thus, the value of each symbol may be translated into a first digit, in this case a bit, for the x-code and a second digit for the y-code. In this manner, two completely independent bit patterns may be obtained. The patterns can be combined into a common pattern that may be coded graphically with the aid of a plurality of symbols according to FIG. 2.

Each position may be coded with the aid of a plurality of symbols. In this example, 4×4 symbols are used for coding a position in two dimensions, i.e., an x-coordinate and a y-coordinate.

The position code may be built up with the aid of a number series of ones and zeroes that have the characteristic that no sequence of four bits occurs more than once in the series. The number series may be cyclic, which means that the characteristic also applies if the end of the series may be coupled together with its beginning. Thus, a sequence of four bits always has an unambiguously determined position in the number series.

In this embodiment, the series can be maximally 16 bits long if it is to have the characteristic for sequences having four bits described above. In this example, however, only a 7-bit-long series according to the following need be used:

"0 0 1 0 1 0"

This series contains seven unique sequences of four bits that code a position in the series according to the following:

| Position in the series | Sequence |
| --- | --- |
| 0 | 0001 |
| 1 | 0010 |
| 2 | 0101 |
| 3 | 1010 |
| 4 | 0100 |
| 5 | 1000 |
| 6 | 0000 |

For coding the x-coordinate, the number series may be written sequentially in columns over the entire surface to be coded. The coding may be based on the difference or position displacement between numbers in adjoining columns. The magnitude of the difference may be determined by the position in the number series at which the column is allowed to begin (i.e., with which sequence). More specifically, if one takes the difference modulo 7 between, on the one hand, a number that may be coded by a four-bit sequence in a first column and which thus can have the value (position) 0-6, and, on the other hand, a corresponding number (i.e., a sequence on the same "level") in an adjoining column, the result may be the same independently of where along the two columns the comparison may be made. Using the difference between two columns, an x-coordinate can be coded that is constant for all y-coordinates.

Since each position on the surface may be coded with 4×4 symbols in this example, three differences (having the value 0-6) are available according to the above for coding the x coordinate. In this embodiment, coding may be performed in such a manner that of the three differences, one will always have the value 1 or 2 and the other two will have the values in the interval 3-6. Thus, in this particular embodiment, no differences will be zero in the x code. In other words, the x-code may be constructed in such a manner that the differences, in this exemplary embodiment, will be as follows:

(3-6) (3-6) (1-2) (3-6) (3-6) (1-2) (3-6) (3-6) (1-2)

Each x-coordinate may be coded with two numbers between 3 and 6, and a subsequent numbers that may be 1 or 2. If, for example, 3 may be subtracted from the high numbers and 1 from the low one, then a number in mixed base will be obtained. This number directly provides a position in the x direction, allowing a determination of from which the x-coordinate can then be determined directly, as shown in the example below.

Using the principle described above, it may be thus possible to code x-coordinates 0, 1, 2 . . . with the aid of numbers that represent three differences. These differences are coded with a bit pattern based on the above number series. Finally, the bit pattern can be coded graphically with the aid of the symbols in FIG. 2.

In many cases, when reading 4×4 symbols it may not be possible to get a complete number that codes the x-coordinate but parts of two numbers. Since the least significant part of the numbers is always 1 or 2, however, a complete number may be reconstructed in a simple manner.

The y-coordinates may be coded in accordance with the same principal. The cyclic number series may be written repeatedly in horizontal rows over the surface to be position-coded. Exactly as in the case of the x-coordinates, the rows may begin at different positions, i.e., with different sequences in the number series. However, it is not the differences that are used for the y-coordinates but the coordinates are coded with numbers based on the starting position of the number series in each row. When the x-coordinate for 4×4 symbols has been determined, it may be possible to determine the starting positions in the number series for the rows that are included in the y code in the 4×4 symbols. In the y code, the most significant digit may be determined by allowing this to be the only one that has a value in a specific interval. In this example, one row of four begins at position 0-1 in the number series, indicating that this row relates to the least significant digit in a y-coordinate, and the other three begin at position 2-6. In the y direction, there may be a number series as follows:

(2-6) (2-6) (2-6) (0-1) (2-6) (2-6) (2-6) (0-1) (2-6)

Each y-coordinate may therefore be coded with three numbers between 2 and 6 and a subsequent number between 0 and 1.

If 0 is subtracted from the low number and 2 subtracted from the high ones, one may obtain a position in the y direction in mixed base, from that the y-coordinate can be determined directly.

With the above method, it may be possible to code 4×4×2=32 positions in the x direction. Each such position corresponds to three differences giving 3×32=96 positions. Furthermore, it may be possible to code 5×5×5×2=250 positions in the y direction. Each such position corresponds to four rows giving 4×250=1000 positions. Together, it is thus possible to code 96000 positions. Since the x coding may be based on differences, it may be possible to select the position at which the first number series begins. Taking into consideration that this first number series can begin at seven different positions, it may be possible to code 7×96000= 672000 positions. The starting position of the first number series in the first column can be calculated when the x coordinate has been determined. The seven different starting positions of the first series can code different sheets or writing surfaces on a product.

To further illustrate the invention according to this embodiment, a specific example follows here that is based on the embodiment of the position code described.

Figure 3:
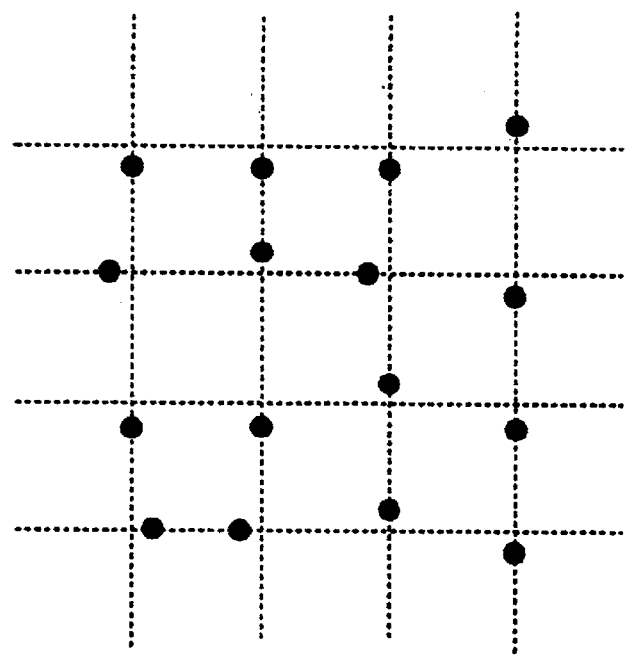
FIG. 3 schematically shows an example of 4×4 symbols which maybe used for coding a position.

FIG. 3 shows an example of an image consistent with the present invention having 4×4 symbols that are read by a device for position determination.

These 4×4 symbols have the following values:

```
4 4 4 2
3 2 3 4
4 4 2 4
1 3 2 4
```

These values represent the following binary x and y codes:

| x code: | y code: |
|---------|---------|
| 0 0 0 0 | 0 0 0 1 |
| 1 0 1 0 | 0 1 0 0 |
| 0 0 0 0 | 0 0 1 0 |
| 1 1 0 0 | 1 0 1 0 |

The vertical x sequences code the following positions in the number series: 2 0 4 6. The differences between the columns will be −2 4 2, which modulo 7 gives: 5 4 2 which, in mixed base, codes position (5-3)×8+(4-3)×2+(2-1)=16+2+1=19. Since the first coded x position is position 0, the difference lies in the interval 1-2 and which appear in the 4×4 symbols may be the 20th such difference. Since, furthermore, there may be a total of three columns for each such difference and there is a start column, the vertical sequence farthest to the right in the 4×4 x code belongs to the 61st column in the x code (3×20+1=61) and that farthest to the left belongs to the 58th.

The horizontal y sequences code the positions 0 4 1 3 in the number series. Since these series begin in the 58th column, the starting position of the rows are these numbers minus 57 modulo 7 providing the starting positions 6 3 0 2. Translated into digits in the mixed base, this becomes 6-2, 3-2, 0-0, 2-2=4 1 0 0 where the third digit may be the least significant digit in the number in question. The fourth digit may then be the most significant digit in the next number and in this case, it may be the same as in the number in question. One exception may be when the number in question consists of the highest possible digits in all positions. It is then apparent that the beginning of the next number is one greater than the beginning of the number in question.

The position of the four-digit number becomes 0×50+4×10+1×2+0×1=42 in the mixed base. The third row in the y code is the 43rd which has the starting position 0 or 1, and since there are four rows in total in each such row, the third row is number 43×4=172. Thus, in this example, the position of the topmost left corner for the 4×4 symbol group is (58,170).

Since the x sequences in the 4×4 group begin in row 170, the x columns of the entire pattern begin at positions ((2 0 4 6) - 169) mod 7=1 6 3 5 of the number series. Between the last starting position (5) and the first starting position, the numbers 0–19 may be coded in mixed base and by adding together the representations for numbers 0–19 in mixed base, the total difference between these columns may be obtained. A primitive algorithm for doing this is to generate these twenty numbers and directly add together their digits. The sum obtained is called s. The sheet or writing surface may then be given by (5-s) modulo 7.

In this example, an embodiment has been described in which each position is coded with 4×4 symbols and a number series with 7 bits may be used. Naturally, this is only an example. Positions can be coded with more or fewer symbols. The number of symbols does not need to be the same in both directions. The number series can have different length and does not need to be binary but may be built up on another base. Different number series can be used for coding in the x direction and coding in the y direction. The symbols can have different numbers of values.

Furthermore, the marking may be a dot. Naturally, it can have a different appearance. For example, the marking may consist of a line that begins in the virtual raster point and extends from that to a predetermined position.

In the example above, the symbols are used within a square partial surface for coding a position. The partial surface can have another form, for example, hexagonal. Neither do the symbols need to be arranged in rows and columns at an angle of 90° with respect to one another but can also be arranged in other configurations.

For the position code to be detectable, the virtual raster must be determined. This can be done by studying the distance between different markings. The shortest distance found between two markings must originate from two adjoining symbols having the value 1 and 3 so that the markings are located on the same raster line between two raster points. When such a pair of markings has been detected, the associated raster points can be determined with knowledge of the distance between the raster points and the displacement of the markings from the raster points. Once two raster points have been located, further raster points can be determined by means of measured distances to other markings and with knowledge of the relative distance of the raster points.

Figure 4:
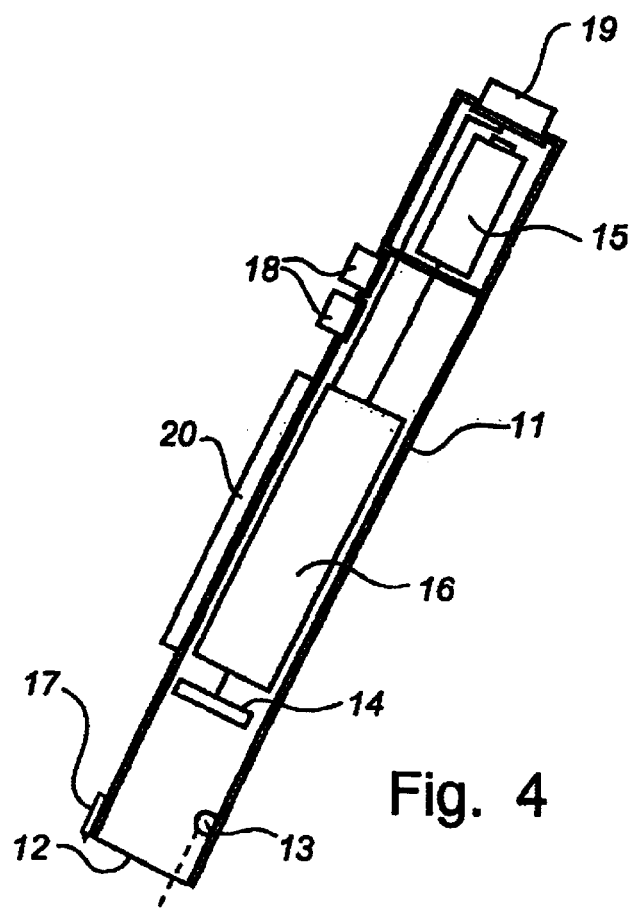
FIG. 4 schematically shows a device according to the present invention which can be used for position determination.

An embodiment of a device for position determination is shown in FIG. 4. In this embodiment, the detector comprises a casing 11, which has the approximate format of a pen. At a short end of the casing there may be an opening 12. The short end is intended to be against or be held at a short distance from the surface on which the position determination is to be performed.

Casing 11 mainly accommodates an optical part, an electronic part and a power supply. The optical part may include at least one light-emitting diode 13 for illuminating the surface to be imaged and a light-sensitive area sensor 14, for example, a CCD or CMOS sensor, to register a two-dimensional image. The device may also contain a lens system.

The power supply for the device may be obtained from a battery 15, mounted in a separate compartment in the casing 11. The electronic part may include image-processing element 16 for determining a position on the basis of the image registered by the sensor 14. Image processing element 16 in this embodiment includes a processor unit with a processor that is programmed to reading images from the sensor and perform position determination on the basis of these images. Image processor element 16 may also, in the alternative, include a specifically designed image processor IC, digital signal processor, etc.

In this embodiment, the device also may further include a writing implement point such as a pen point 17 to write normal pigment-based writing on the surface on which the position determination is to be performed. Pen point 17 may be retracted and extended so that the user can control whether or not it is to be used. In certain applications, pen point 17 may be absent.

Due to the fact that the image-processor element in the device may be arranged to determine the position in a "rule-based" manner, the device does not require a large amount of storage capacity, which may be an advantage with respect to the manufacturing costs of the device and the possibility of producing a stand-alone unit.

Further devices such as reading pens can be provided with different capacity for reading and decoding position information and marking information. For example, a simple and inexpensive reader may be produced for simply reading the pattern at the lowest spatial resolution level while a more advanced and more expensive reader can be produced for reading information at a number of spatial resolution levels. Either of the aspects falls within the scope contemplated for the present invention.

The device may also include buttons 180 to activate and control it. In the exemplary embodiment, it also has a transceiver 190 for wireless transmission or communication, e.g., by means of IR light or radio waves, of information to and from the device. In this embodiment, the device also includes a display 200 for showing positions or registered information.

Applicant's international patent application WO 98/20446 describes a device for registering text. This device can be used for position determination if it is programmed in a suitable manner. If it is to be used for pigment-based writing, it should also have a pen point.

The device can be divided into different physical casings, a first casing containing components for obtaining images of the position-coding pattern and for transferring them to components located in a second casing and that perform the position determination on the basis of the registered image or images.

As mentioned, position determination may be performed with a processor programmed with software for locating and decoding the symbols in an image and for determining the positions from the codes. On the basis of the above example, a person skilled in the art can design software that performs position determination on the basis of an image of a part of a position-coding pattern. Furthermore, a skilled person can design software for printing the position-coding pattern on the basis of the above description.

Computer programs of the present preferred embodiment may be independently used with other position-determining devices. These programs may be installed in a separate computer that can receive images of the position-coding pattern, or in the actual device that registers the position-coding pattern.

In the disclosed embodiment, the pattern is optically readable and the sensor is thus optical. As mentioned, the pattern can be based on a parameter other than an optical parameter. In such a case, naturally, the sensor may be of a type that can read the parameter in question.

In the above embodiment, the raster is a grid network. It can also have other forms. In the embodiment above, the longest possible cyclic number series which is used. This provides a certain redundancy that can be used, for example, to check the turning of the read group of symbols.

Figure 5:
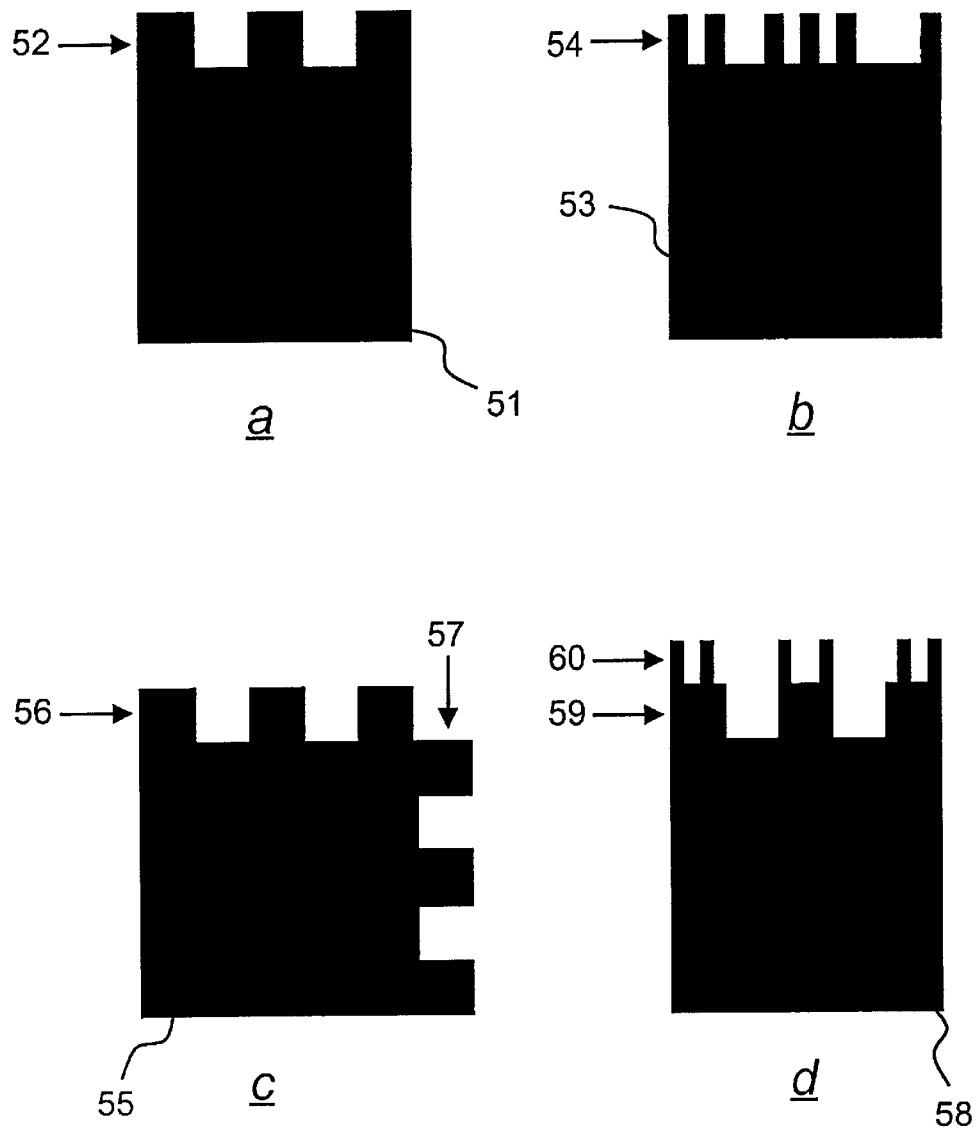
FIGS. 5a–5d show examples of symbols with markings containing further binary-coded information at a number of spatial resolution levels.

FIGS. 5a–5d show four examples of symbols with markings that contain further binary-coded information at a number of spatial resolution levels. FIG. 5a shows a marking 51 that, for example, maybe one of the markings in one of the above examples. The marking 51 is of rectangular form and can be read at a first spatial resolution level. A further marking pattern 52, readable at a second spatial resolution level, constitutes a part of the marking 51 and with a binary interpretation, this further pattern 52 has, for example, the binary value "10101".

FIG. 5b shows, analogously to FIG. 5a, a marking 53 at a first spatial resolution level and a further marking pattern 54 that may be readable at a second spatial resolution level, the binary value will be "1010010101001".

FIG. 5c shows, analogously to FIGS. 5a and 5b, a marking 55 at a first spatial resolution level and two further marking patterns 56 and 57, which are readable at a second spatial resolution level and the binary values of which are "10101" and "10101", respectively.

FIG. 5d shows, analogously to FIGS. 5a–5c, a marking 58 at a first spatial resolution level and two further marking patterns 59 and 60, readable at a second spatial resolution level and the binary value of which are "10101" and, respectively, readable at a third spatial resolution level and the binary value of which is "101010010101".

There are many variations that may be made consistent with the present invention. The foregoing description is presented for purposes of illustration and description. It is not exhaustive and does not limit the invention to the precise form disclosed. Modifications and variations are possible in light of the above teachings or may be acquired from practicing the invention. The scope of the invention is defined by the claims and their equivalents.

Concurrently filed with the application for this patent are applications entitled Systems and Methods for Information Storage based on Swedish Application No. 0000947-2, filed Mar. 21, 2000, and U.S. Provisional Application No. 60/207,839, filed May 30, 2000; Secured Access Using a Coordinate System based on Swedish Application No. 0000942-3, filed Mar. 21, 2000, and U.S. Provisional Application No. 60/207,850 filed on May 30, 2000; System and Method for Printing by Using a Position Coding Pattern based on Swedish Application No. 0001245-0, filed on Apr. 5, 2000, and U.S. Provisional Application No. 60/210,651, filed on Jun. 9, 2000; Apparatus and Methods Relating to Image Coding based on Swedish Application No. 0000950-6, filed on Mar. 21, 2000, and U.S. Provisional Application No. 60/207,838, filed on May 30, 2000; Apparatus and Methods for Determining Spatial Orientation based on Swedish Application No. 0000951-4, filed on Mar. 21, 2000, and U.S. Provisional Application No. 60/207,844, filed on May 30, 2000; System and Method for Determining Positional Information based on Swedish Application No. 0000949-8, filed Mar. 21, 2000, and U.S. Provisional Application No. 60/207,885, filed on May 30, 2000; Method and System for Transferring and Displaying Graphical Objects based on Swedish Application No. 0000941-5, filed Mar. 21, 2000, and U.S. Provisional Application No. 60/208,165, filed May 31, 2000; Online Graphical Message Service based on Swedish Application No. 0000944-9, filed Mar. 21, 2000, and U.S. Provisional Application No. 60/207,881, filed May 30, 2000; Method and System for Digitizing Freehand Graphics With User-Selected Properties based on Swedish Application No. 0000945-6, filed Mar. 21, 2000, U.S. Provisional Application No. 60/207,882, filed May 30, 2000; Data Form Having a Position-Coding Pattern Detectable by an Optical Sensor based on Swedish Application No. 0001236-9, filed Apr. 5, 2000, and U.S. Provisional Application No. 60/208,167, filed May 31, 2000; Method and Apparatus for Managing Valuable Documents based on Swedish Application No. 0001252-6, filed Apr. 5, 2000, and U.S. Provisional Application No. 60/210,653 filed Jun. 9, 2000; Method and Apparatus for Information Management based on Swedish Application No. 0001253-4 filed Apr. 5, 2000, and U.S. Provisional Application No. 60/210,652, filed Jun. 9, 2000; Device and Method for Communication based on Swedish Application No. 0000940-7, filed Mar. 21, 2000, and U.S. Provisional Application No. 60/208,166, filed May 31, 2000; Information-Related Devices and Methods based on Swedish Application No. 0001235-1, filed Apr. 5, 2000, and U.S. Provisional Application No. 60/210,647, filed Jun. 9, 2000; Processing of Documents based on Swedish Application No. 0000954-8, filed Mar. 21, 2000, and U.S. Provisional Application No. 60/207,849, filed May 30, 2000; Secure Signature Checking System based on Swedish Application No. 0000943-1, filed Mar. 21, 2000, and U.S. Provisional Application No. 60/207,880, filed May 30, 2000; Identification of Virtual Raster Pattern, based on Swedish Application No. 0001235-1, filed Apr. 5, 2000, and U.S. Provisional Application No. 60/210,647, filed Jun. 9, 2000, and Swedish Application No. 0004132-7, filed Nov. 10, 2000, and U.S. Provisional Application No. 60/261,123, filed Jan. 12, 2001; and a new U.S. Provisional Application entitled Communications Services Methods and Systems 60,277,285.

The technical disclosures of each of the above-listed U.S. applications, U.S. provisional applications, and Swedish applications are hereby incorporated herein by reference. As used herein, the incorporation of a "technical disclosure" excludes incorporation of information characterizing the related art, or characterizing advantages or objects of this invention over the related art.

In the foregoing Description of Preferred Embodiments, various features of the invention are grouped together in a single embodiment for purposes of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Description of the Preferred Embodiments, with each claim standing on its own as a separate preferred embodiment of the invention.

What is claimed is:

1. A product comprising:
   a surface having a coding pattern for position determination, wherein the coding pattern includes symbols representing at least two different values, wherein each symbol includes a raster point and at least one marking, wherein the raster point is included in a raster extending over the surface, and wherein the location of the marking in relation to a raster point determines a value of each symbol; and
   at least one marking having marking information, wherein the markings in the coding pattern at a first spatial resolution level are substantially identical to each other, wherein at least one marking in a second spatial resolution level is different than the first level, and wherein the second level has a higher resolution than the first level.

2. A product according to claim 1, wherein the coding pattern is a position-coding pattern that codes a plurality of positions on the surface, each position being coded by a plurality of symbols.

3. A product according to claim 2, wherein each symbol contributes to the coding of more than one of said plurality of positions.

4. A product according to claim 3, wherein each symbol contributes to the coding of both a first and a second position coordinate.

5. A product according to claim 4, wherein the value of each symbol is translatable into at least a first digit for coding the first position coordinate and at least a second digit for coding the second position coordinate, and wherein the symbols in the position-coding pattern together represent a first position code and a second position code.

6. A product according to claim 5, wherein the position-coding pattern is based on a first cyclic number series, and wherein no sequence with a first predetermined number of digits occurs more than once in the number series.

7. A product according to claim 5, wherein the first coordinate is coded by a first cyclic number series, wherein no sequence with a first predetermined number of digits occurs more than once in the number series, wherein the series is repeated in columns over the surface, and wherein the columns begin at different locations in the number series.

8. A product according to claim 7, wherein the second coordinate is coded by a second cyclic number series, wherein no sequence with a second predetermined number of digits occurs more than once in the number series, wherein the series is repeated in columns over the surface, and wherein the columns begin at different locations in the number series.

9. A product according to claim 8, wherein the product comprises a plurality of writing surfaces, each including the position-coding pattern, the position-coding patterns differing for the different writing surfaces by the sequence in the cyclic number series with which a predetermined column or row begins.

10. A product according to claim 9, wherein the raster and the raster point are virtual.

11. A product according to claim 1, wherein each symbol has at least one marking that can be placed in one of four predetermined positions on the lines of the raster so that the symbol has at least four values.

12. A product according to claim 1, wherein the marking information is coded as a pattern varying in a binary manner.

13. A product according to claim 1, wherein the coding pattern is optically read.

14. A program, stored on a computer-readable medium, for determining a position of a partial surface on a principle surface having a position-coding pattern comprised of a plurality of symbols, wherein each symbol includes a raster point and at least one marking, said program comprising instructions for locating a predetermined plurality of symbols in an image of the partial surface;

determining the value of each said predetermined plurality of symbols;

separating the position-coding pattern into a first position code for a first coordinate of the partial surface and a second position code for a second coordinate of the partial surface by translating the value of each symbol into at least a first digit for the first position code and at least a second digit for the second position code;

calculating the first coordinate using the first position code and the second coordinate using the second position code;

calculating the value of each symbol by determining the location of each marking in relation to the raster point, wherein each symbol has at least one marking in one of four predetermined positions on the lines of the raster so that the symbol has at least four values;

locating at least one marking having marking information; and interpreting the marking information.

15. A system comprising:

a sensor configured to detect an image from a partial surface of a plurality of partial surfaces on a principle surface, wherein the partial surface includes a position-coding pattern, and an image-processing element configured to:
locate a predetermined plurality of symbols in the image, wherein each symbol includes at least one marking;
determine the value of each of said predetermined plurality of symbols;
separate the position-coding pattern in the image into a first position code for a first coordinate for the partial surface and into a second position code for a second coordinate for the partial surface by translating the value of each symbol into at least a first digit for the first code and at least a second digit for the second code;
calculate the first coordinate using the first position code and the second coordinate using the second position code;
locate at least one marking which comprises marking information; and
interpret the marking information, wherein the marking information is coded as a pattern varying in a binary manner.

16. A system according to claim 15, wherein the sensor is handheld.

17. A system according to claim 16, wherein the sensor further includes a transceiver configured to communicated the detected image via wireless transmission.

18. A system comprising:

a sensor configured to produce an image of a partial surface from a plurality of partial surfaces on a product, wherein each partial surface includes a position-coding pattern, wherein the position-coding pattern includes a plurality of symbols, wherein each symbol includes a raster point and at least one marking; and a program, stored on a computer-readable medium and in communication with the sensor, the program including instructions to:
locate a predetermined plurality of symbols in the image of the partial surface;
determine the value of each said predetermined plurality of symbols;
separate the position-coding pattern into a first position code for a first coordinate of the partial surface and a second position code for a second coordinate of the partial surface by translating the value of each symbol into at least a first digit for the first position code and at least a second digit for the second position code;
calculate the first coordinate using the first position code and the second coordinate using the second position code;
calculate the value of each symbol by determining a location of each marking in relation to the raster point;
locate at least one marking having marking information; and interpret the marking information.

19. A method for determining the position of a partial surface on a principle surface having a position-coding pattern that includes a plurality of symbols, wherein each symbol includes a raster point and at least one marking, said method comprising:

locating a predetermined plurality of symbols in an image of the partial surface;

determining the value of each said predetermined plurality of symbols;

separating the position-coding pattern into a first position code for a first coordinate of the partial surface and a second position code for a second coordinate of the partial surface by translating the value of each symbol into at least a first digit for the first position code and at least a second digit for the second position code;

calculating the first coordinate using the first position code and the second coordinate using the second position code;

calculating the value of each symbol by determining the location of each marking in relation to the raster point;

locating at least one marking having marking information; and interpreting the marking information.

* * * * *